US 007286936B2

(12) United States Patent
Gelfand et al.

(10) Patent No.: US 7,286,936 B2
(45) Date of Patent: Oct. 23, 2007

(54) STRUCTURAL-GEODYNAMIC METHOD OF FORECASTING OF LOCALIZING HIGHLY PERMEABLE POROUS-FRACTURED COLLECTING BASINS DEVELOPMENT ZONES AND HYDROCARBONS DEPOSITS

(76) Inventors: Mark Gelfand, 2 Renaissance Ct., Thornhill, Ontario (CA) L4J 7W4; Anatoly Vostokov, 16 Krakovskaya Street, Apt. 51, Kiev (UA) 01094

( * ) Notice: Subject to any disclaimer, the term of this patent is extended or adjusted under 35 U.S.C. 154(b) by 0 days.

(21) Appl. No.: 11/391,624

(22) Filed: Mar. 29, 2006

(65) Prior Publication Data

US 2007/0038378 A1 Feb. 15, 2007

(30) Foreign Application Priority Data

Mar. 31, 2005 (CA) .................................... 2502871

(51) Int. Cl.
*G01V 11/00* (2006.01)
(52) U.S. Cl. ................. 702/5; 702/13; 702/15
(58) Field of Classification Search .................. 702/5, 702/2, 15, 13, 12
See application file for complete search history.

(56) References Cited

U.S. PATENT DOCUMENTS

| 4,421,981 | A | * | 12/1983 | Hough | ...................... 250/253 |
| 5,596,494 | A | * | 1/1997 | Kuo | .............................. 702/2 |
| 5,995,681 | A | | 11/1999 | Lee et al. | |
| 6,345,108 | B1 | | 2/2002 | Faraj | |
| 6,587,600 | B1 | | 7/2003 | Shipley | |
| 6,618,678 | B1 | | 9/2003 | Van Riel | |
| 6,664,529 | B2 | * | 12/2003 | Pack et al. | ............... 250/208.1 |
| 6,859,416 | B2 | * | 2/2005 | Inubushi | ...................... 367/14 |
| 6,873,265 | B2 | * | 3/2005 | Bleier | ........................ 340/690 |
| 2004/0098200 | A1 | | 5/2004 | Wentland et al. | |
| 2004/0201585 | A1 | | 10/2004 | Srivastava et al. | |
| 2004/0210547 | A1 | | 10/2004 | Wentland et al. | |
| 2004/0215428 | A1 | | 10/2004 | Bras et al. | |

* cited by examiner

*Primary Examiner*—Donald E McElheny, Jr.
(74) *Attorney, Agent, or Firm*—Sim & McBurney

(57) ABSTRACT

A method for prospecting for oil and gas deposits is provided, said method comprising: outlining of highly permeable collecting basins development zones, performing an aerospace survey of a landscape, determining a spectral reflectivity over the landscape, and incorporating the height profile, block fields, aerospace survey and spectral relativity in order to produce a predictiveis provided.

10 Claims, 3 Drawing Sheets

STRUCTURAL-GEODYNAMIC METHOD OF FORECASTING OF LOCALIZING HIGHLY PERMEABLE POROUS-FRACTURED COLLECTING BASINS DEVELOPMENT ZONES AND HYDROCARBONS DEPOSITS

FIELD OF THE INVENTION

The present invention relates generally to a method of prospecting for hydrocarbons. In particular it relates to a structural-geodynamic method of forecasting of localizing highly permeable porous-fractured collecting basins development zones and hydrocarbons deposits

BACKGROUND OF THE INVENTION

Spatial localization of accumulations of oil and gas is an important scientific and commercial task tackled by geological science. As a result of this work, various methods and techniques have been created. These methods have the same purpose i.e. the forecasting of oil and gas resources based on such criteria as efficiency and, localizing of zones of highly permeable collecting basins. However, they use absolutely different methods and techniques.

There exists a well-known classical method of prospecting for oil and gas based on exploration of seismic profiles with the purpose of finding "traps", i.e. natural reservoirs filled with oil and gas, with subsequent drilling of deep expensive wildcat wells, but only three of every ten "traps" contain commercial hydrocarbon deposits. The shortcoming of this method is the low rate of success in prospecting and high costs.

There exists another well-known method of prospecting for hydrocarbons based on seismic prospecting. This method suffers from relatively high costs i.e. the cost is 10 times higher than the method disclosed below. Further this method offers relatively low correlation with discovery of oil and gas. Some of the explanation lies with the fact that in physical terms the method is based on the phenomenon of formation of the trace of the diffusive flow above the accumulations of oil and gas. In such an approach errors can occur if the diffusive flow remains while oil or gas are absent. The method detects the fact of vertical migration of hydrocarbons rather than the deposits themselves.

There also exists another method titled "Method of detecting accumulations of hydrocarbons including oil fields, natural gas pools and gas condensate reservoirs and other deposits located at various depths, as well as contamination of the earth surface with hydrocarbons and other chemical substances based on remote sounding of the earth surface and bottom layer of the atmosphere differing from other methods in that it uses an ultraviolet wavelength band for remote sounding" (Registration number of application: 98109321/28 dated Sep. 27, 2000, RU). This method, however, does not provide for the obtaining direct information on manifestations of solids dispersion processes and development of geodynamic processes. The zones of dispersion are identified based on formal procedure of identification of crossing of lineaments, and as practice has shown in 75% of cases this procedure leads to errors. Further, the information received with the use of this method does not contain data on the location of the structure affected by dispersion in volumetric terms, and therefore it does not allow making conclusions on manifestations of processes of dispersion as a function of sections of deposits being explored. The method provides a low rate of successful confirmation of the results of the forecasts for zones of dispersion, especially in case of determination of the location of planned wells (not more than 0.20-25%) due to the shortcomings in the scientific substantiation of the model of formation of structures affected by thinning dispersion at the modem stage. The method suffers from a lack of the information on geoindicating factors of landscapes reflecting the features of the formation and manifestations of geofluid-dynamic processes, which are regarded as of first importance in the process of exploration of zones affected by dispersion processes. Finally, the method suffers from relatively high cost. A structural-geodynamic method of forecasting of localizing highly permeable porous-fractured collecting basins development zones and hydrocarbons deposits is based on the genetic correlation between certain features of landscapes with the existence of highly permeable porous-fractured collecting basins development zones and of hydrocarbons deposits, formed as a result of tectonic thinning dispersion of solids.

This method differs from other known methods in that it uses specific processing ("deciphering") of information contained in photographs taken in the visible, infrared and heat wavelength bands and earth surface photometry as well as results of mathematical analysis of height profiles of landscapes, data on the structure of block fields of the objects being explored and optical characteristics of the landscape and allows to detect spectrometric and structural-geochemical anomalies. Then the processed data is compared with reference data and this allows making a conclusion on the productivity of oil and natural gas fields and the extent to which the explored object is developed in the context of the zones of highly permeable porous-fractured collecting basins.

SUMMARY OF THE INVENTION

In an aspect of the invention, there is provided a method for prospecting for oil and gas deposits, said method comprising: outlining of highly permeable collecting basins development zones, performing an aerospace survey of a landscape, determining a spectral reflectivity over the landscape, incorporating the height profile, block fields, aerospace survey and spectral relativity in order to produce a predictive analysis of linear zones and recent vertical displacements of the landscape.

In another aspect of the invention, there is provided a method for prospecting for oil and gas deposits, said method comprising: outlining of highly permeable collecting basins development zones, performing an aerospace survey of a landscape, performing a land radar survey of the landscape performing a field photographic survey of the landscape determining a spectral reflectivity over the landscape, incorporating the height profile, block fields, aerospace survey and spectral relativity in order to produce a predictive analysis of linear zones and recent vertical displacements of the landscape.

The proposed methods allow outlining the locations of deposits of gas and oil and zones of highly permeable porous-fractured collecting basins at the stage of prospecting for oil and gas.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
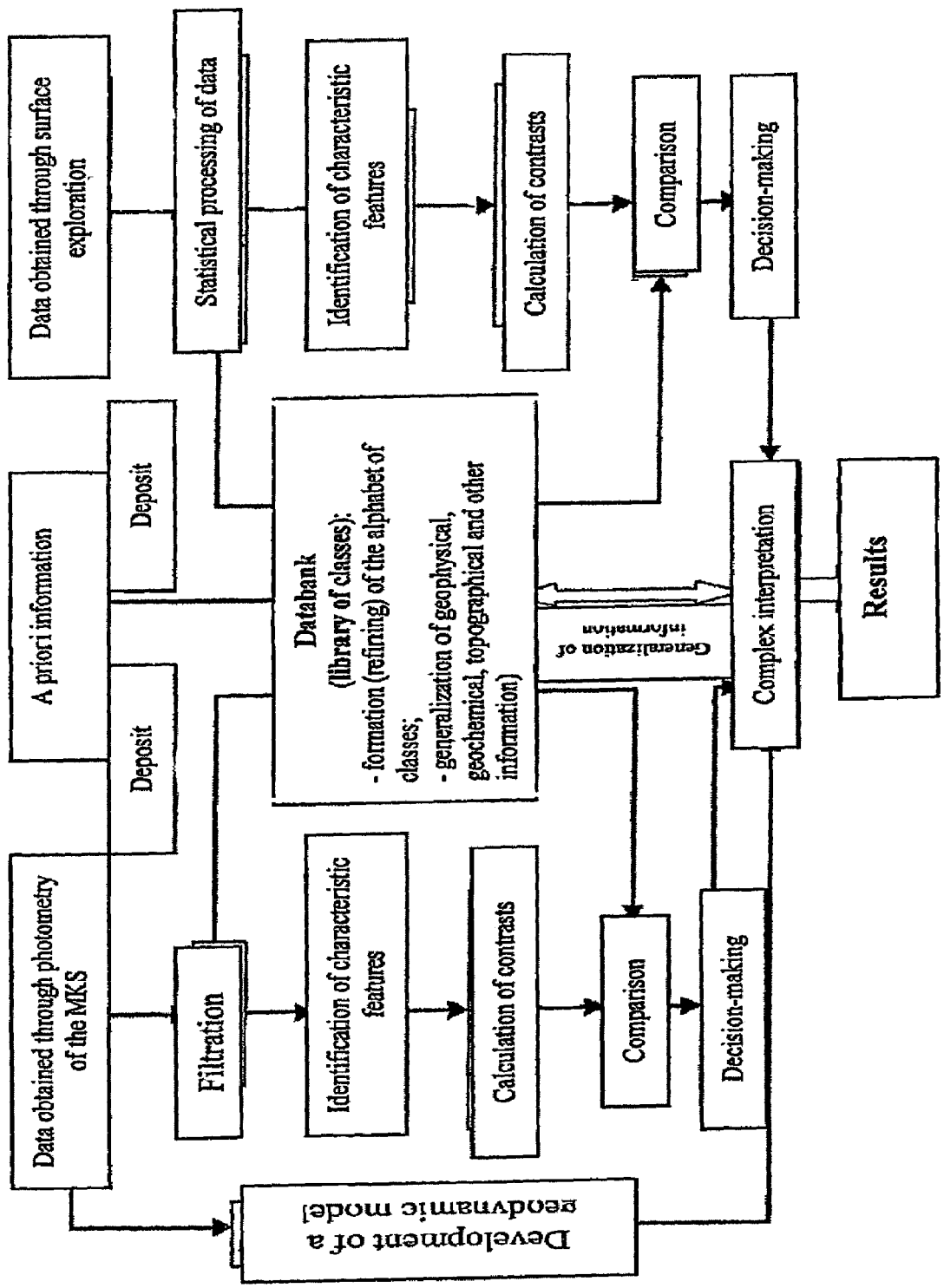
FIG. 1 shows a block diagram of the process of processing of the results of remote and surface photometry with the purpose of detecting optical anomalies.

This method is based on the theory of geo fluid dynamic structures (GFDS) of the lithosphere. This theory infers linear zones of the curve of the tension-deformation condition of the lithosphere which are, as a rule, of vertical, and less often, of subvertical character. The method is also based on detection of anomalies in multispectral and height profiles of landscapes, associated with recent vertical displacement of the earth surface over accumulations of hydrocarbons, as well as the features of the reflective characteristics of the elements of the landscapes located over oil and gas deposits.

According to one embodiment, the instant method can be divided into a set of consecutive operations:

Step 1: Exploration of the height profile and block fields of landscapes including:

1.1. Outlining of highly permeable collecting basins development zones includes the following steps:

1.1.1. Structural-geomorphologic surveying, 1.1.2. Producing topographic maps including man-made features—roads, villages, industrial facilities and sites, etc., 1.1.3. Detection of landscape features and objects connected with the geofluid dynamic structures (GFDS) (average dispersion), 1.1.4. Producing maps showing distribution of average dispersion, 1.1.5. Producing maps showing lineaments, 1.2. Aerospace geological (geodynamic) surveying including:

1.2.1. Selection of objects on which information is to be obtained with the use of aerospace multizone and radiolocation surveying according to the following criteria: season when the surveying is carried out; multizone survey ranges (VNIR, SWIR, TIR bands); cloudiness; time of the day, 1.2.2. Preliminary processing of the information obtained during surveying: geometrical correction; spectral correction; contrasting; and quantization;

1.2.3. Deciphering the lineament net and producing a map showing lineaments, 1.2.4. Deciphering the geodynamic nodes and producing a map, 1.2.5. Estimating the geofluidodynamic features of the geodynamic nodes (identification of geofluidodynamic structures) and their component elements—average dispersion; Analysis of geofluidodynamic and aerospace geological survey; Production of maps showing the location of highly permeable porous-fractured collecting basins development zones. The zones characterized by dispersion are identified based on the landscape features reflecting the processes of soils' thinning and dispersion and migration of formation fluids. This allows identification of zones characterized by dispersion with probability of up to 85%.

Step 2: Exploration of the landscape in the optical field. In the process of remote or earth surface survey of territories and objects one identifies linear optical anomalies in reflective characteristics of plants growing over oil deposits and natural gas pools. Detection of the areas of optical anomalies on the explored territory is carried out based on the analysis of linear anomalies, detected on surface routes and remote profiles.

2.1. Remote exploration. Such methods are used in case of utilization of materials obtained in the course of space-and-aerial surveying in multiple zones with the use of narrow spectral bands, which range from 0.45 to 0.9 microns and from 8.5 to 12.5 microns with spatial resolution not less than 30 m. Technology of processing of the materials obtained in the course of a multizone survey includes: production of a synthesized image based on the available materials; identification of plots of land with homogeneous vegetation; topographic representation of the structures underlying oil and/or natural gas fields on a map; choice of a rational net of profiles and points at which photometry measurements are to be made; determination of quantitative characteristics of the entire array of video images zone; and preliminary statistical processing of obtained parameters.

2.2: Earth surface measurements. Earth surface measurements are carried out in order to compare the obtained results with those of remote measurements made. Reference plots of land are used. These have been investigated via drilling and are in the same geological and landscape conditions as the explored objects. The technology of processing of the materials obtained in the course of an earth surface survey includes photometry of varies kinds of homogeneous plants growing within the limits of the explored objects and at the background areas. Depending on the kind of species of plants (trees, shrubs, bushes, grass, etc.) one uses different type photometers. The measurements are carried out in the same spectral bands as in the case of remote exploration. The widths of the spectral bands need not exceed 15-20 nm. The time during which the photometry measurements are made need not exceed 1.5 hour. In case of earth surface reconnaissance the routes for photometry measurements are to be chosen within the obtained remote profile. Statistical processing of the results of earth surface photometry is carried out with the use of standard methods.

Step 3: Processing. Mathematical processing of the results of earth surface and remote exploration, detection of linear and area optical and thermal anomalies is accomplished with the use of factor analysis and other standard software products. This is based on the complex use of the results of the registration of optical reflective characteristics of plants by distant and earth surface methods. This technology includes statistical processing of photometry results, identification of informative signs, plotting related analytical curves and systems of isolines, complex analysis with the use of a priori information, calculation of the spectral contrasts for anomalies and their topographic co-ordinates, evaluation of the intensity and interpretation.

3.1. Statistical processing and averaging measurements results. This step is used for discarding those magnitudes of the parameters, whose standard deviation exceeds the tripled standard deviation calculated for the entire sample of the collected plants of a certain species for the given route:

$$s = \sqrt{\frac{\sum_{1}^{n}(\hat{r} - r_i^j)^2}{n-1}} \quad (1)$$

where s is the standard deviation for the sample for the measured value of the reflection value in the point for the zone of the spectrum r average value of the sample reflection value and n is the number of measurements made with the sample. Each sample is a set of measured data for a particular route and kind of vegetation. As a result of statistical processing of the obtained data for each area explored one obtains arrays of primary data of dimension (N×M), where N is the number of points on the route where samples have been collected, M is the number of the zones of the spectrum used. Each element of such an array r (i, j) is characterised by the reflection value for vegetation in the i-th point of the route for the j-th zone of the spectrum. The schemes of processing of remote and earth surface photometry are identical. The difference consists only in the nature of the information processed: in case of photometry of materials obtained in the course of aerospace surveying of multiple zones this information consists of the values of relative brightness of the video images BAX, which are functions of the coefficients of zone brightness (CZB) at each point in zones of the spectrum, where photometry has been carried out, and in case of earth surface photometry such information consists of the values of CZB in three to eight zones of the spectrum. The information obtained in each of the branches is divided into two flows: information from reference deposits is intended for clarification and formation of the alphabet of classes, and information from explored sites is used for the formation of typical multidimensional spectral characteristics (vectors) of the condition of the vegetation in each point where photometry has been carried out. The dimension of this vector corresponds to the number of channels (zones), in which records have been made. In most cases the information on the objects explored is incorporated in a number of different characteristics rather than a single characteristic. In practice in case of remote sounding of vegetation one widely uses various combinations of characteristics of brightness, which are one-dimensional complex spectral deciphered characteristics (vegetation indices).

Figure 2:
FIG. 2 shows a 3 line filter example of the behaviour of the value of the factor F1 for oak leaves selected along one of the reference routes at a deposit of hydrocarbons.

3.2: The Use of factor analysis model. The parameters r(i,j) characterising the spectral reflective characteristics of the vegetation are normally distributed random variables with finite dispersion, which correlate with each other. This is a consequence of their linear dependence on a certain number of other parameters, reflecting the characteristics of the environment, including oil and gas accumulations. The essence of the factor analysis is the search for these unknown linearly independent (orthogonal) parameters, called factors. In this case matrix R is the matrix of output data used for the factor analysis. Identification of factors is carried out with the use of "main components" method. The number of the selected factors is determined through setting the minimal numbers of elements of the correlation matrix, which are used for evaluation of the degree of correlation between the factors with all output parameters. FIG. 2 shows a 3 line filter example of the behaviour of the value of the factor F1 for oak leaves selected along one of the reference routes at a deposit of hydrocarbons. The calculations have been made for 8 zones of the spectrum, which correspond to the reflective characteristics of oaks on wavelengths of 450, 500, 550, 600, 700, 720 and 750 nanometers. The measurements have been carried out with the use of spectrophotometer SF-18 of spectral resolution of 1 nanometer, the measurement accuracy being 1%. The analysis of the matrix characterising the influence ("load") of the selected factors shows that the variable factor F1 is influenced by the high "load" produced by the first seven variables. A part of the entire dispersion attributed to the F1 factor is 0.74.

3.3: Evaluation. The intensity of anomalies and clarification of their borders have been made based on the analysis of the values of contrasts between the object and the background. The values of contrasts of spectral reflection value in each point of a route have been calculated with the use of an applied program and the current value of the reflective characteristic of the vegetation along the route for j-th spectral channel. The program outputs the values of contrasts in the form of an array of data.

Figure 3:
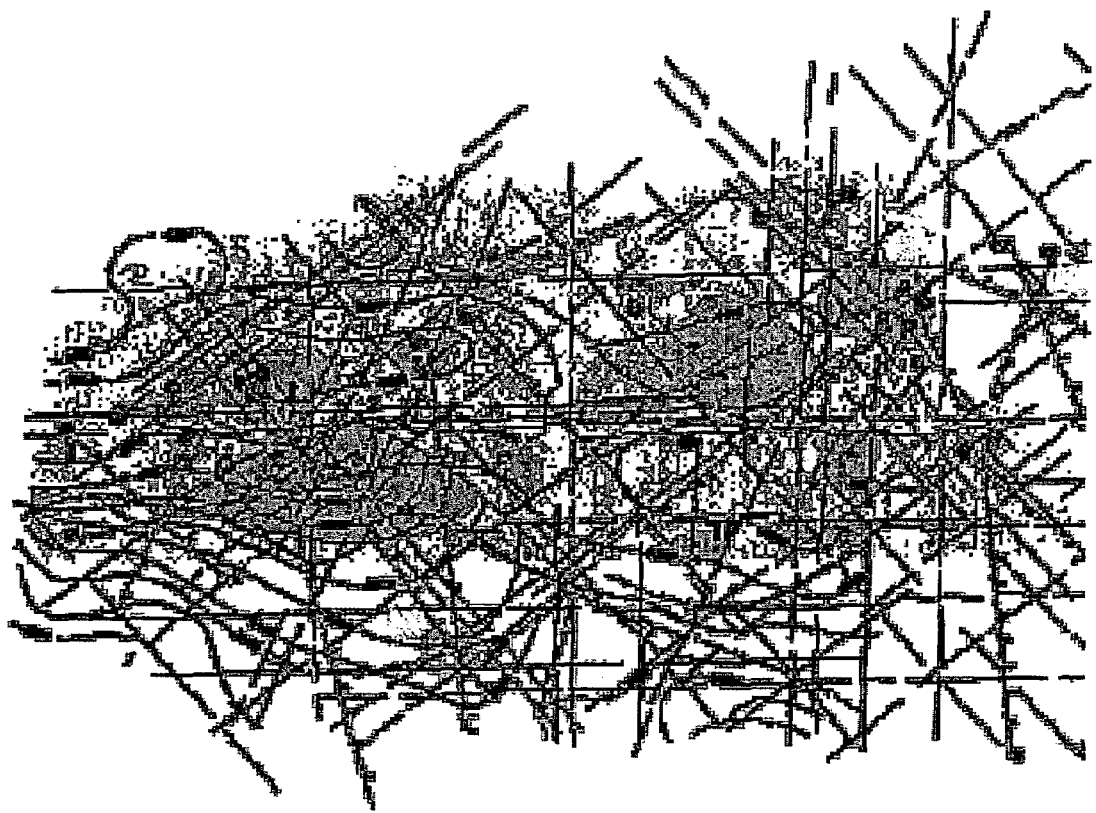
FIG. 3 shows a map plotting the locations of optical anomalies associated with oil and gas accumulations.

Step 4: Formation of data based on the results of earth surface and remote exploration. The main technical result of the use of this method is the creation of maps (see FIG. 3) plotting the locations of optical anomalies associated with oil and gas accumulations (projects of oil and gas production with good prospects for the future), such maps being the main criteria for drilling wildcats.

According to another embodiment of the present invention, the developed method includes:

Complex aerospace research for invisible, infrared, thermal spectrums and radar-tracking range on land and in near-shore zones (at a shelf with the application techniques of remote systems diagnostics and earth remote sensing; and Field works for determining the influence of the anomalous factors above oil and gas deposits on vegetation in a visible spectrum.

Complex aerospace research including the following stages: Preparation works (encapsulation of space, geo-geophysical and topographical information); Thematic decoding of materials of aerospace shootings (study of optical characteristics of landscapes, account of contrasts and vegetative indexes), selection of optical anomalies; Structural—geomorphological research, the fulfillment of field works, generation of landscape and geo-geophysical models, the integrated analysis of models and outputs of structural—geomorphologic, field and remote research; Selection of perspective objects, sites for drilling of prolific wells, block fields, construction of resulting maps on paper and magnetic carriers, drawing up of a report for a customer on executed research.

Preparation works involving the preparation of the researched territory and general geological data, for a comparison with materials received after space shooting is decoded. The task is the survey study of researched territory general characteristics: Landscape (geomorphologic, botanical, hydrological, soil, and other); and Structural (tectonic)—Oil and gas (geological)—Geophysical—Biochemical Gas (chemical)—Neo (tectonic)—Geodynamic.

After preparation works there is thematic decoding of materials of aerospace shootings. This involves regional and local research of perspective sites. Tasks of this stage include determination of researched square prospect and decision making about expediency of local research; and fulfillment of selected sites local research to determine coordinates for drilling of prolific wells. The substeps of the stage are: Complex aerospace research; a study of a landscape optical field and revealing of thermal anomalies in separate zones of spectrum; and comprehensive analysis of researches outcomes(comprehensive analysis and geological interpretation of isomeric type anomalies (area anomalies) and a linear type (linear anomalies). The decoding is made processing aerospace surveyed materials in narrow spectral bands: 0.45 to 0.9 microns (visible & near infrared); 8.5 to 12.5 microns (thermal); and 0.8-23.0 cm (radar). The used multi-zone surveyed materials should correspond to the certain space and spectral resolution specifications. The influence of the anomalous factors to vegetation results in their multi-spectral characteristics and to physiological modifications.

The third stage is the completion of structural—geomorphological research & field works. The purpose of stage three is a determination of cumulative effect on optical characteristics of vegetation using ground colorimetry. Tasks of this stage include analysis of soil and vegetative space placing; analysis of hydrological researches data; colorimetry of vegetation sample in researched regions; Preprocessing of obtained materials (analysis of anomalies space placing and analysis of probability of anomalies fluid-dynamic conditionality); and component analysis of multizone shooting materials.

The fourth stage is the preparation of the report on the executed Research. The purpose of stage four is the comprehensive analysis of local research and determination of site coordinates for drilling of prolific wells. Tasks in this stage include: Mapping of oil-and-gas prospects; ranking of geophysical structures (objects, prepared by a geophysical method) on a efficiency criterion; mapping of zones of rocks softening (sites for drilling of prolific wells) and scheming of studied sites break-block structure. The result is a Map of highly permeable porous-fractured collecting basins development zones for determination sites for drilling of prolific wells.

The rate of success of such kind of exploration is high: it has not been found less than 85%. The advantages of the new method for localizing highly permeable porous-fractured collecting basins development zones:

1. The probability of the correct localizing highly permeable porous-fractured collecting basins development zones is increased from 25% to 85%, i.e. more than three times.

2. The range of possibilities is considerably widened:

2.1. It is obviously possible to drill wildcats with the purpose of obtaining high-output results, and this cannot be obtained with the use of the method—prototype.

2.2. It is possible to outline, the plots of land containing abnormally large accumulations of methane within mine fields, and this enables safety measures to be developed and implemented and methane to be utilized.

2.3. The efficiency of oil deposits and gas pools development is increased owing to increase in the number of prolific wells and, as a consequence, the volume of production of oil and gas is increased without any additional investment.

The technical result of this invention is obtaining new kind of information on the zones of dispersion, which is used as a basis for forecasting related to highly permeable collecting basins:

1. The locations of highly permeable collecting basins development zones are outlined in volumetric terms.

2. The bonndaries and internal structure of the zones characterized by dispersion are also outlined, and this allows for identification of land plots with maximal manifestations of the dispersion processes and, as a consequence, plots of land where highly permeable collecting basins are developed.

The graphic result of this technical result is a map of highly permeable collecting basins development zones with the following scales: 1:25,000-1:10,000, and this map can be used for drilling prolific wells.

Data, confirming the possibility to use the invention:

Commercial approbation of the method has been carried out in the areas used by the Tynmen oil company, Russia and DK "Ukrgazvidobuvannya" (Evgenievskaya area—FIG. 4).

In Tallinskaya area 28 oil producing wells have been drilled with the use of this method. The results obtained in case of 24 of them confirm proper forecast (rate of success 86%). Besides the method in question has been used for dividing all of the areas into separate zones, which differ in terms of permeability of the collecting basins. The highest daily production rates (up to 125 tons of oil per day at a background level of 5-10 tons per day) have been obtained in the zones of highly permeable collecting basins.

At the commencement of the exploration at the Evgenievskaya area there already existed producing wells with known production rates: No. 2, 4 and 9. The drilling of well 14 was underway. Based on the results of the approbation of the proposed technology at this area one has concluded that wells No. 6, 8, 10 and 12 which were to be drilled as wildcat wells will be non-productive and well No. 14 and 20 will produce oil. Further exploration provided evidence of the correctness of this forecast.

Approbation results provide evidence of high efficiency of the invention and the necessity to introduce it into the practice of geological exploration and prospecting for oil, natural gas, thermal, mineral, balneo- and sweet water, as well as mining for detection of abnormal accumulations of methane within mines' limits.

What is claimed is:

1. A method for prospecting for oil and gas deposits, said method comprising:
   outlining of highly permeable collecting basins development zones,
   performing an aerospace survey of a landscape,
   determining a spectral reflectivity over the landscape,
   incorporating the height profile, block fields, aerospace survey and spectral relativity in order to produce a predictive analysis of linear zones and recent vertical displacements of the landscape.

2. The method of claim 1 wherein said outlining further comprises:
   structural-geomorphologic surveying,
   producing topographic maps including man-made features, detection of landscape features and objects connected with the geofluid dynamic structures,
   producing maps showing distribution of average dispersion, and producing maps showing lineaments.

3. The method of claim 1 wherein said performing further comprises:
   selection of objects for surveying according to aerospace multizone and radiolocation surveying,
   preliminary processing of information obtained during surveying including geometrical correction, spectral correction, contrasting, and quantization,
   deciphering of a lineament net to map lineaments,
   deciphering geodynamic nodes,
   estimating the geofluidodynamic features of the geodynamic nodes, and
   mapping the location of highly permeable porous-fractured collecting basins development zones.

4. The method of claim 1 wherein said determining further comprises:
   exploration of the landscape in the optical field by remote exploration and earth surface measurements.

5. The method of claim 4 wherein said remote exploration further comprises: the use of narrow spectral bands, which range from 0.45 to 0.9 microns and from 8.5 to 12.5 microns with spatial resolution not less than 30 m.

6. A method for prospecting for oil and gas deposits, said method comprising:
   outlining of highly permeable collecting basins development zones,
   performing an aerospace survey of a landscape,
   performing a land radar survey of the landscape
   performing a field photographic survey of the landscape
   determining a spectral reflectivity over the landscape,
   incorporating the height profile, block fields, aerospace survey and spectral relativity in order to produce a predictive analysis of linear zones and recent vertical displacements of the landscape.

7. The method of claim 6 wherein said outlining further comprises:
structural-geomorphologic surveying,
producing topographic maps including man-made features, detection of landscape features and objects connected with the geofluid dynamic structures,
producing maps showing distribution of average dispersion, and producing maps showing lineaments.

8. The method of claim 6 wherein said performing an aerospace survey further comprises:
selection of objects for surveying according to aerospace multizone and radiolocation surveying,
preliminary processing of information obtained during surveying including geometrical correction, spectral correction, contrasting, and quantization,
deciphering of a lineament net to map lineaments,
deciphering geodynamic nodes,
estimating the geofluidodynamic features of the geodynamic nodes, and
mapping the location of highly permeable porous-fractured collecting basins development zones.

9. The method of claim 6 wherein said determining further comprises:
exploration of the landscape in the optical field by remote exploration and earth surface measurements.

10. The method of claim 9 wherein said remote exploration further comprises: the use of narrow spectral bands, which range from 0.45 to 0.9 microns and from 8.5 to 12.5 microns with spatial resolution not less than 30 m.

* * * * *